(12) United States Patent
Simnacher

(10) Patent No.: US 8,531,052 B1
(45) Date of Patent: Sep. 10, 2013

(54) AUXILIARY ENERGY GENERATOR FOR USE WITH A WIND ENERGY SYSTEM

(76) Inventor: Larry W. Simnacher, Bay City, TX (US)

( * ) Notice: Subject to any disclaimer, the term of this patent is extended or adjusted under 35 U.S.C. 154(b) by 490 days.

(21) Appl. No.: 12/899,105

(22) Filed: Oct. 6, 2010

Related U.S. Application Data

(63) Continuation-in-part of application No. 12/845,161, filed on Jul. 28, 2010, which is a continuation-in-part of application No. 11/617,581, filed on Dec. 28, 2006, now Pat. No. 7,918,648.

(51) Int. Cl.
*F03D 3/04* (2006.01)

(52) U.S. Cl.
USPC .............................................. 290/55; 290/54

(58) Field of Classification Search
USPC ......................................... 290/43, 44, 54, 55
See application file for complete search history.

(56) References Cited

U.S. PATENT DOCUMENTS

| | | | | |
|---|---|---|---|---|
| 4,315,713 A | * | 2/1982 | Verplanke | 415/125 |
| 4,357,130 A | * | 11/1982 | Forrest | 416/197 A |
| 5,350,273 A | * | 9/1994 | Hector et al. | 415/4.1 |
| 5,472,311 A | * | 12/1995 | Davis | 415/4.1 |
| 6,069,409 A | * | 5/2000 | Fowler et al. | 290/55 |
| 6,481,957 B1 | * | 11/2002 | Brill | 415/4.1 |
| 6,655,907 B2 | * | 12/2003 | Brock et al. | 415/4.2 |
| 6,981,839 B2 | * | 1/2006 | Fan | 415/4.1 |
| 7,315,093 B2 | * | 1/2008 | Graham, Sr. | 290/55 |
| 7,471,006 B2 | * | 12/2008 | Janca et al. | 290/43 |
| 8,257,020 B2 | * | 9/2012 | Graham, Sr. | 415/4.3 |

\* cited by examiner

*Primary Examiner* — Nicholas Ponomarenko
(74) *Attorney, Agent, or Firm* — Egbert Law Offices, PLLC

(57) ABSTRACT

A wind power generator has a frame, an axle extending horizontally and rotatably mounted relative to the frame, a plurality of arms extending radially outwardly of the axle, a plurality of panels respectively connected to the plurality of arms, and an electrical generator positioned adjacent to the arms for producing electrical energy as the arms rotate relative to the frame. The electricity generator includes an annular housing, a coil positioned in the housing so as to define a pathway through an interior of the coil, and a magnet slidably received in the pathway so as to be movable through the coil as the axle rotates. The magnet is magnetically attracted to the arm.

12 Claims, 3 Drawing Sheets

AUXILIARY ENERGY GENERATOR FOR USE WITH A WIND ENERGY SYSTEM

CROSS-REFERENCE TO RELATED APPLICATIONS

The present application is a continuation-in-part of U.S. application Ser. No. 12/845,161, filed on Jul. 28, 2010, and entitled "Wind Energy Generator With Coordinated Blades", presently pending. U.S. application Ser. No. 12/845,161 is a continuation-in-part of U.S. application Ser. No. 11/617,581, filed on Dec. 28, 2006, and entitled "Wind Power Generator Apparatus", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and systems for the generation of electricity by the action of wind. More particularly, the present invention the relates to wind power generators having a generally horizontal axle or shaft. More particularly, the present invention relates to wind power generators having wind-receiving panels or vanes which move in coordinated fashion so as to maximize power output while minimizing drag. The present invention also relates to apparatus and system for the auxiliary production of electrical energy from Faraday generators that are positioned adjacent to the panels.

2. Description of Related Art Including Information Disclosed Under 37 CFR 1.97 and 37 CFR 1.98.

Wind energy generation is becoming increasingly popular as a means for producing energy. The production of energy from the motion of wind is a safe, clean and efficient power source. As the blades of the wind power generator rotate, they correspondingly rotate the shaft of a turbine so as to produce energy. This energy can be delivered for personal or commercial use. Large wind energy farms are now being built wherein a great deal of wind energy can be obtained and relatively windy areas of the country.

One of the problems associated with the prior art wind energy generators is the action of the drag of the wind on the action of the blade. For example, when one of the blades of a wind energy generator is capturing wind, another of the blades creates drag which inhibits the free rotation of the blades. As such, it is extremely desirable to minimize the drag on the blade during rotation of the blades by the action of wind.

In the past, wind energy generators have not utilized the action of gravity so as to effect the minimization of drag on the blades. Since virtually all wind energy generators have the blades mounted to a horizontal shaft and in which all of the blades face the wind. It is virtually impossible to minimize the action of drag without a rotation of the blades during the rotation of the shaft. In other words, when the full face of the blade faces the wind, drag will be inherent. However, if it were possible to rotate the blade so that the thin edge of one of the blades faces the wind while another of the blades captures the wind, then drag can be minimized. Unfortunately, such systems for the simultaneous rotation of the individual blades during the rotation of the shaft are exceedingly complex and expensive. As such, it is desirable to minimize the drag-producing profile of the individual blades during the rotation of the shaft so as to, accordingly, minimize the drag.

Generally, compact wind energy systems are not available. Under certain circumstances, it is not necessary to have a very large wind energy generator in order to capture the desired amount of wind energy and to produce a desired amount of power. Conventionally, wind energy generators are installed in a fixed location. If it is desired to have the blades of the wind energy generator face the direction of on-coming wind, then complex rotation mechanisms are installed so that the blades can be directed to face the direction of wind. These wind energy generators, in the past, have not been easily portable and deployable.

In the past, various patents have issued relating to wind energy generators which can adjust the orientation of the individual shutter during the rotation of the shaft of the generator. For example, U.S. Pat. No. 5,126,584 describes a wind energy generator that is configured so as to rotate about a vertical shaft. Each vane of the wind energy generator is formed of an outer stationary shutter and a movable inner shutter. The movable inner shutter is capable of pivoting about its longitudinal axis. A control mechanism is provided so as to adjust the angular orientation of the movable shaft.

U.S. Pat. No. 4,551,631 teaches an wind energy plant that is positioned on a vertical axis. A plurality of shutter assemblies are disposed in a circular orientation around each turbine associated and are independently operable for causing wind current to be directed thereby for rotating the turbine assemblies. Five wall elements extend outwardly tangential to the periphery defined by the shutter assemblies and intercept the wind current and direct the wind currents toward the shutter assemblies. A control system for the manipulation of shutter relative to the wind conditions is also described.

U.S. Pat. No. 591,775, issued on Oct. 12, 1887, is an early patent describing the use of shutter assemblies for a windmill. The shutter assemblies are arranged about a vertical axis of rotation. A mechanism is provided to control the orientation of the blade such that as the windmill rotates, the flat sides of the shutters will be presented to receive the full force of the wind. As they move rearwardly and forwardly, the shutters will gradually turn to present their edges to the wind so as to avoid any reduction in the rotation speed of the windmill. As the blades pass across the rear portions of the windmill into the direction of the wind, the blades will be turned at different angles so as to receive the wind and to assist in the rotation of the windmill.

U.S. Pat. Nos. 4,486,143 and 6,942,454 each describe deflector panels which serve to control the volume of air which bypasses each panel so as to avoid turbulence adjacent the driving vanes of the turbine.

U.S. Pat. No. 7,365,448, issued on Apr. 29, 2008 to T. G. Stephens, shows a wind-driven power generator that includes a rotor disposed in a cylindrical duct and supported by a frame for rotation in response to wind flowing through the duct. The rotor includes a plurality of circumferentially-spaced parallel rotor blades supported for rotation about a generally horizontal axis. Each blade is supported for pivotal movement to change blade pitch, angle of attack or camber as the rotor rotates. A pitch or camber control motor or self-governing wind vane mechanism is operable to move a circular cam to vary blade pitch or camber to control rotor speed. The duct is mounted on a mast having a base supported on a foundation for pivotal movement to face the wind for maximizing air flow through the duct.

U.S. Pat. No. 4,678,394, issued on Jul. 7, 1987 to F. E. Willoughby, describes a self-governing energy panel that is used as a group of panels designed to collect wind force. The panel is hung on bearings that are on support beams that protrude out from the horizontal shaft of the machine. The panel has the majority of its length below the bearings. The panel will hang vertically relative to the ground in calm periods but with increasing wind speed, the panel can change to a completely horizontal position by rotating on the bearings. The force of the wind will cause the panel to carry the support beam in a forward direction and turn the main horizontal shaft of the machine so as to turn a generator.

U.S. Pat. No. 4,679,985, issued on Jul. 14, 1987 to L. Worms, shows an energy converter that has a frame, a rotor mounted in the frame with a rotor shaft and vanes, and an element that can connect the rotor shaft to a generator, an alternator or another energy-converting mechanism. Each vane has a holder, a plurality of blades which hinge in the holder about small axes which lie in parallel relationship with the rotor shaft, and stops for the blades. The blades are a plurality of leaves which hinge on one another about axes which lie in parallel relationship with the rotor shaft. Stops limit the relative hinging motion of the leaves, on the one hand, to the position where they lie in extension of one another, and, on the other hand, to a position where the leaves form angles, for example in the range of 135 degrees.

Faraday generators are known in the art for the production of small amounts of electrical energy. Typically, these Faraday generators have been utilized with self-powered flashlights in which a housing has a coil positioned therein. The coil defines a longitudinal pathway within the flashlight. A magnet is positioned within this longitudinal pathway. The user can shake the flashlight back-and-forth for a period of time in order to generate enough electrical energy so as to power the lightbulb of the flashlight for desired period of time. Faraday generators are known in other fields and will, typically, have a magnet movable relative to the field of an excited coil.

Wind power generators have been known in the past for the production of electrical energy. In all circumstances, it would be desirable to produce as much electrical energy as possible during the rotation of the blades of the wind power generator. Once source of power is simply the rotation of the blades of the wind power generator and the use of such rotational energy for the movement of a turbine so as to produce electrical energy. Additional appliances connected to the blades of the wind power generator have not been known in the art. Additionally, the electrical energy production can be enhanced by the application of greater torque to the turbine. As such, there is a need to produce as much power as possible from the wind power generator during the rotation of the blades.

It is an object of the present invention to a wind energy generator which produces electrical energy by the action of wind.

It is another object of the present invention to provide a wind energy generator which minimizes the drag affecting the rotation of the blades.

It is another object of the present invention to provide a wind energy generator in which the orientation of the panels or vanes of the wind energy generator move in a coordinated fashion.

It is still another object of the present invention to provide a wind energy generator that can include supplemental electricity generation as a result of rotation of the panels or vanes.

It is another object of the present invention to provide a wind energy generator which is portable and/or capable of being mounted upon a vehicle.

It is still a further object of the present invention to provide a wind energy generator which is reliable, cost-effective and energy efficient.

It is another object of the present invention to provide an auxiliary electrical generator which produces additional amounts of electrical energy from the movement of the panels of a wind energy generator.

It is still a further object of the present invention to provide a wind energy generator in which a magnetic force is applied to the blades so as to maximize the torque of the blades upon the turbine so as to enhance the production of power therefrom.

These and other objects and advantages of the present invention will become apparent from a reading of the attached specification and appended claims.

BRIEF SUMMARY OF THE INVENTION

The present invention is a wind power generator that comprises has a frame, an axle extending horizontally and rotatably mounted relative to the frame, a plurality of arms extending radially outwardly of the axle, a plurality of panels respectively connected to the plurality of arms, and an electrical generator positioned adjacent to the arms. The electrical generator produces electrical energy as the arms rotate relative to the frame.

In the present invention, the electricity generator is a Faraday generator extending adjacent to the plurality of arms. The Faraday generator has an electrical line connected thereto. This electrical line is suitable for passing electrical energy from the Faraday generator to a location away from the frame. The Faraday generator includes an housing, a coil positioned in the housing so as to define a pathway through an interior of the coil, and a magnet slidably received in the pathway so as to be movable through the coil as the axle rotates. The housing is affixed to the frame. The housing is an annular member and the pathway is a generally circular pathway. In the preferred embodiment of the present invention, the housing has a first portion with a radius of curvature less than a radius of curvature of a second portion of the housing. The housing has a wall separating the magnet from the coil. This wall can have at least one projection extending into the pathway. The magnet is magnetically attracted to at least one of the plurality of arms such that the arm moves the magnet through the pathway because of the magnetic attraction. The housing extends in a plane transverse to a plane in which each of the plurality of panels extend.

The housing, in the preferred embodiment, can include a first housing positioned adjacent to the plurality of arms at one end of the plurality of panels and a second housing positioned adjacent the plurality of arms at an opposite end of the plurality of panels.

The plurality of panels are hingedly connected to the plurality of arms at a location distal of the axle. Each of the plurality of panels extends so as to have an edge opposite the hinged connection proximal the axle. The wind power generator of the present invention further includes a plurality of rollers respectively affixed adjacent the edge of the plurality of panels and a line received by the plurality of rollers.

The plurality of arms can include a first pair of arms extending radially and outwardly of the axle in generally parallel relation to each other, a second pair of arms extending radially and outwardly of the axle in generally parallel relation to each other, and a third pair of arms extending radially and outwardly of the axle in generally parallel relation to each other. The plurality of panels includes a first panel hingedly connected to the first pair of arms, a second panel hingedly connected to the second pair of arms, and a third panel hingedly connected to the third pair of arms.

DETAILED DESCRIPTION OF THE INVENTION

Figure 1:
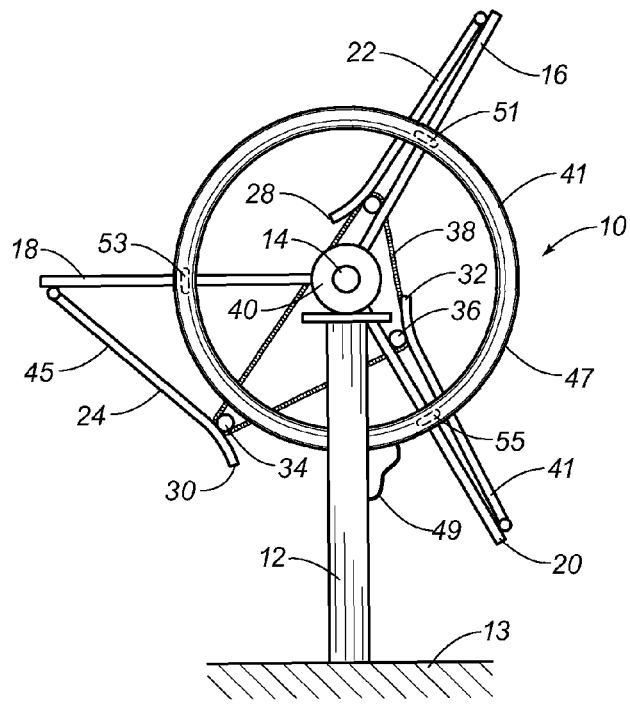
FIG. 1 is a side elevational view of the wind energy generator in accordance with the preferred embodiment of the present invention.

Referring to FIG. 1, there is shown the wind energy generator 10 in accordance with the preferred embodiment of the present invention. The wind energy generator 10 has a frame 12 that extends upwardly from an underlying surface 13. An axle 14 extends horizontally and is rotatably mounted to the frame 12. A plurality of arms 16, 18 and 20 extend radially outwardly of the axle 14. A plurality of panels 22, 24 and 26 are respectively hingedly connected to arms 16, 18 and 20. Each of the panels 22, 24 and 26 are hingedly connected to the arms 16, 18 and 20 at a location distal to the axle 14. Each of the panels 22, 24 and 26 has respective edges 28, 30 and 32 positioned proximal to the axle 14.

The panel 22 has a roller 33 mounted to a surface of the panel 22 adjacent to the edge 28. The panel 24 has a roller 34 mounted adjacent to the edge 30. The panel 26 has a roller 36 affixed to a surface thereof adjacent to the edge 32. A line 38 is received by the rollers 33, 34 and 36 so as to form a continuous loop. The axle 14 is illustrated as extending through an interior of the continuous loop of the line 34.

As used herein, the term "roller" can refer to a variety of structures. The roller can be a sheave, a pulley, a sprocket, or similar mechanism that allows the line 38 to extend therearound and therethrough. The term "line" as used herein can refer to a variety of structures. The line 38 can be a chain (as illustrated in FIG. 1), a cord, a belt, a cable, or similar structures.

In FIG. 1, it can be seen that the line 38 serves to assure proper coordinated movement of the panels 22, 24 and 26 during the rotation of the axle 14. In FIG. 1, as the wind is moving from left to right, the wind will impact upon an outer surface of the panel 22. This will cause the arm 16 to rotate in a clockwise direction. The drag force of the wind is deflected by the surface of the panel 24. The panel 26 is positioned in a generally vertical orientation. The wind is prevented from having drag forces affecting panel 26 by the blocking effect caused by the angular orientation of the panel 24.

As the panel 24 moves upwardly during the rotation of the axle 14, the panel 24 will assume a generally vertical orientation so as to receive the full force of the wind thereagainst. The movement of the panel 24 into this orientation will cause, through the use of line 34, the other panels to deflect. Since the line 34 is of a fixed circumference, the panels 22, 24 and 26 will have coordinated movement assured during each rotation of the axle 14. Additionally, gravity will tend to urge each of the panels 22, 24 and 26 downwardly. This gravity-driven force will cause the rollers 33, 34 and 36 to exert a force upon the line 38 in order to cause the panels 22, 24 and 26 to assume their desired drag-minimizing orientation. As such, the wind energy generator 10 of the present invention can produce energy in a very efficient manner with a minimum of drag. The orientation of the panels 22, 24 and 26 will be assured regardless of the amount of wind that is imparted upon the panels 22, 24 and 26.

In FIG. 1, it can be seen that the frame 12 includes a vertical member that supports bearings 40 at an upper end thereof. The frame 12 is illustrated as fixedly mounted in an underlying surface 13, such as the earth. The axle 14 is received within the bearings 40 in a relatively low-friction manner.

In FIG. 1, it can be seen that there is an electricity generator 41 that is affixed in a position adjacent to the arms 16, 18 and 20. In particular, and as will be described hereinafter, the electricity generator 41 can be affixed to the frame 12 so as to be in a fixed position relative to the rotating arms 16, 18 and 20. The electricity generator 41 is in the nature of a Faraday generator. As can be seen in FIG. 1, the electricity generator 41 has a tubular body 47 that extends in a generally circular orientation. An electrical line 49 can extend from the electricity generator 41 so as to pass electricity generated from the electricity generator 41 to a location away from the frame 12. The line 49 can be connected to the power mains or to a battery for the purpose of supplying energy from the electricity generator 41.

A plurality of magnets 51, 53 and 55 are positioned within the interior of the tubular body 47. In particular, magnet 51 is aligned with arm 16. Magnet 53 is aligned with arm 18. Magnet 55 is aligned with arm 20. The magnets 51, 53 and 55 are magnetically attracted to the metal material of the respective arms 16, 18 and 20. As such, the motion of the arms 16, 18 and 20 will move the respective magnets 51, 53 and 55 through the interior of the tubular body 47. The movement of the magnets 51, 53 and 55 through the coil contained within tubular body 41 (as illustrated hereinafter) will serve to produce electrical energy in the nature of a Faraday generator. As such, electrical energy is produced both by the rotation of the blades 22, 24 and 26 about the axle and also by the magnets 51, 53 and 55 through the interior of the electricity generator 41.

In FIG. 1, the electricity generator 41 is shown as having a generally circular tubular body 47. However, as will be described hereinafter, the electricity generator 41 can have a somewhat oblong tubular body 47. Through the proper orientation of the oblong tubular body (and the magnets contained therein) additional torque can be imparted to the respective arms 16, 18 and 20 in the location where such torque is needed the most, i.e. at a far point away from the centerline of the axle 14. As such, the electricity generator 41 enhances the torque effect so that the maximum torque is applied by the electricity generator 41 in the location where it is needed most. The smooth contours of the tubular body 47 assures that the magnets 51, 53 and 55 can move smoothly and easily through the interior thereof and will avoid adverse frictional effects. Within the concept of the present invention, several magnets, such as magnets 51, 53 and 55 can be used. Alternatively, a single magnet can be applied within the tubular body 47. In actual use, the relatively heavy magnet can move downwardly through the influence of gravity) so as to also urge the associated arm downwardly. As such, to a certain extent, the magnets facilitate the rotation of the arms (and the connected panels).

Figure 2:
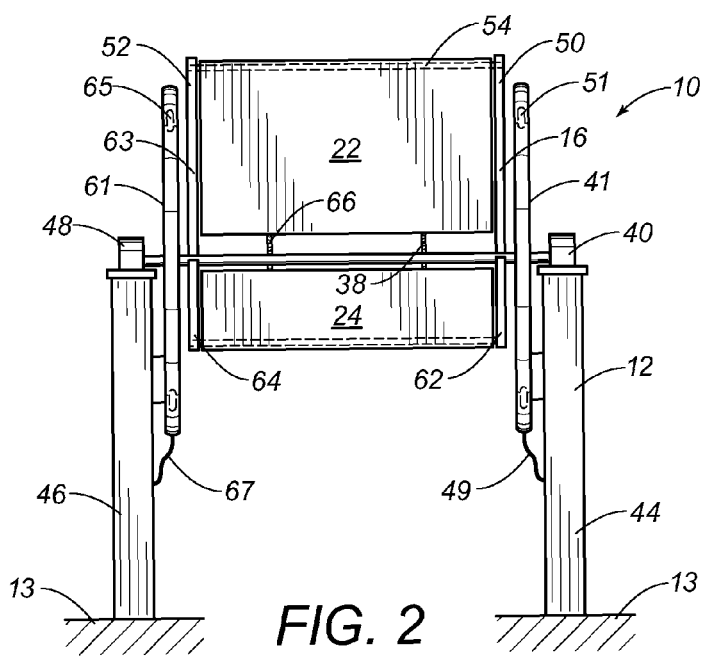
FIG. 2 is a frontal view showing the wind energy generator in accordance with the preferred embodiment of the present invention.

FIG. 2 shows a frontal view of the wind energy generator 10 in accordance with the present invention. In FIG. 2, it can be seen that the frame 12 includes a first vertical member 44 and a second vertical member 46. Each of the vertical members 44 and 46 are fixedly mounted onto the underlying surface 13. Bearings 40 and 48 receive opposite ends of the axle 14 therein. The first arm 16 includes a first pair of arms 50 and 52. Arms 50 and 52 extend outwardly of the axle 14 in generally parallel relationship to each other. A hinge 54 is mounted adjacent to the end of the arms 50 and 52 opposite the axle 14. Hinge 54 will allow the panel 22 to pivot relative to the arms 50 and 52 during the rotation of the axle 14. The second arm 18 includes an arm 62 and an arm 64. The panel 24 is affixed to the arms 62 and 64. The line 38 can include a first line 38 and a second line 66. Lines 38 and 66 extend in generally parallel relationship to each other on opposite sides of the center line of the panels 22 and 24.

In FIG. 2, it can be seen that the panel 22 receives the full force of the wind thereagainst. The panel 24 deflects the oncoming wind downwardly. The panel 26 will be generally obscured by the orientation of the panel 24. As such, any adverse drag caused by the panel 26 is effectively avoided.

It should be noted that within the wind energy generator 10, as illustrated in FIGS. 1 and 2, suitable turbines can be connected to the axle 14 in a conventional manner. These turbines are well known in the art and can be easily integrated in association with the axle 14.

In FIG. 2, it can be seen that there is a first electricity generator 41 and a second electricity generator 61 positioned on opposite ends of the panels 22 and 24. The electricity generator 41 is located adjacent to the arm 16. The electricity generator 61 is positioned adjacent to the arm 63. A magnet 51 is illustrated as being positioned adjacent to the arm 16. The magnet 65 is shown as adjacent to the arms 63. The electricity generators 41 and 61 are connected to the respective vertical members 44 and 46 of the frame 12. As such, these electricity generators 41 and 61 are fixedly positioned relative to the rotating wind energy generator of the present invention.

As can be seen in FIG. 2, there are a pair of electricity generators 41 and 61 incorporated into the construction of the present invention. As such, power can be generated from these electricity generators 41 and 61 in a complementary manner. Each of the respective magnets 51 and 65 will move through the interior of the tubular body 47 of the electricity generators so as to produce electrical energy therein. A line 49 is connected to the first electricity generator 41 and will extend along the vertical member 44 of frame 12. Another electrical line 67 is connected to the second electricity generator 61 and will extend along the vertical member 46 to a location away from the frame 12. As such, a significant amount of energy can be delivered to a location remote from the wind energy generator 10.

Figure 3:
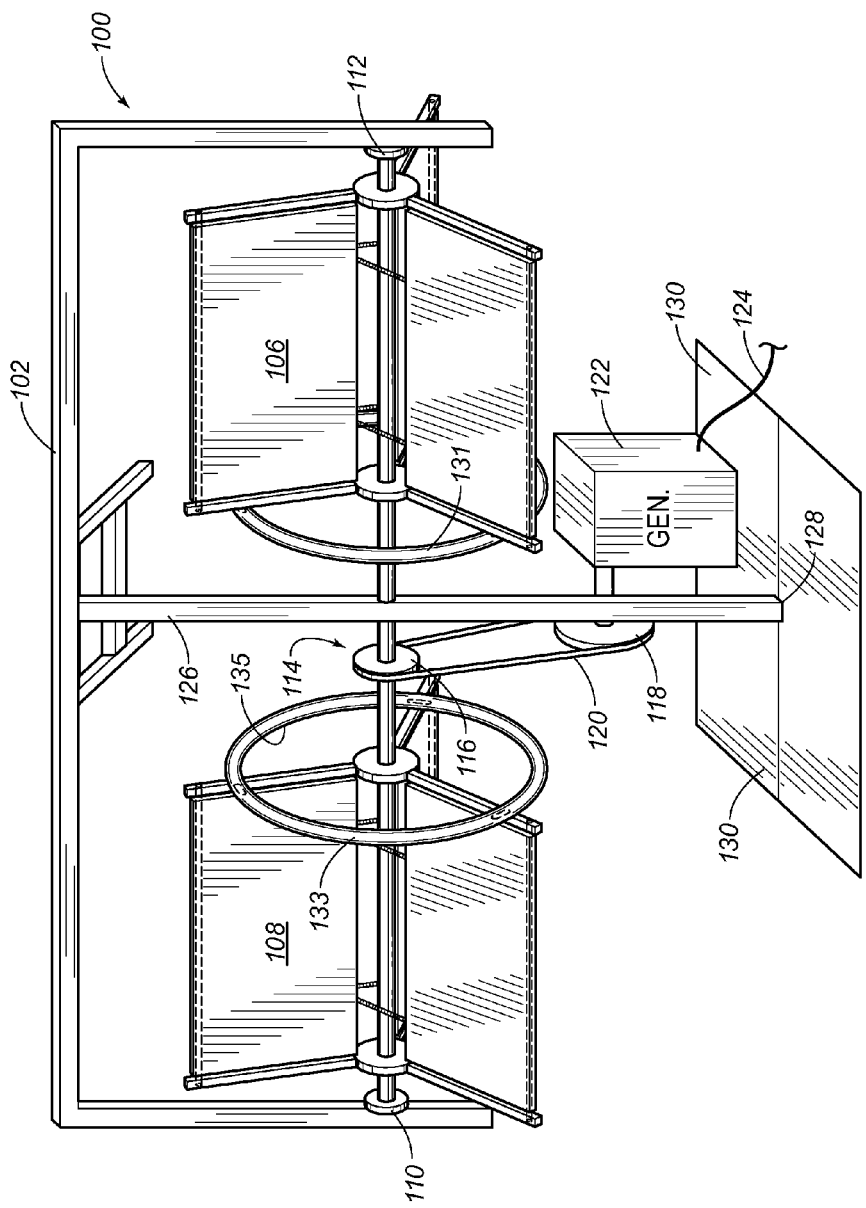
FIG. 3 is a perspective view showing an arrangement of wind energy generators as deployed upon a truck bed.

FIG. 3 shows an assembly 100 employing the wind energy generators of the present invention. As can be seen, the assembly 100 includes a frame 102 having an axle 104 extending thereacross. A first wind energy generator 106 is connected to the axle 104 in the manner described hereinpreviously. Similarly, a second wind energy generator 108 is affixed to the axle 104 in the manner described hereinbefore. The axle 104 is received by suitable bearings 110 and 112 located at opposite ends of the frame 102.

In FIG. 3, there a transmission system 114 that is affixed to the axle 104. The transmission system 114 includes a first wheel 116 and a second wheel 118 that are connected by a belt 120. As such, as the axle 104 rotates, the wheel 116 is suitably driven, along with the belt 120, so as to rotate the wheel 118. Wheel 118 has an axle connected to a shaft of a generator 122. Generator 122 has a line 124 extending outwardly therefrom so that electrical energy can be passed outwardly of the assembly 100.

In FIG. 3, the frame 102 includes a vertical member 126 extending downwardly. The bottom 128 of the vertical member 126 is illustrated as mounted in the bed 130 of truck. Suitable connection systems can be employed with the bed 130 so as to properly receive the vertical member 126. The vertical member 126 can be rotatably mounted within the bed 130 so as to allow the user of the wind generator assembly 100 to properly direct the frame 102 so that the wind energy generators 106 and 108 face the full force of the wind. Alternatively, the rotation mechanism will allow the wind energy generators 106 and 108 to properly "vane" so as to receive the full force of the wind.

Each of the wind energy generators 106 and 108 has configuration similar to that illustrated in FIGS. 1 and 2. The dual mounting of the wind energy generators 106 and 108 within frame 102 can enhance the amount of power generated by the wind generator assembly 100.

In FIG. 3, it can be seen that there is a first electricity generator 131 positioned adjacent to the first wind energy generator 106 and a second electricity generator 133 positioned adjacent to the second wind energy generator 108. Each of the electricity generators 131 and 133 has a generally circular shape. The first electricity generator 131 is positioned adjacent to the arms that extend outwardly of the axle of the first wind energy generator 106. Similarly, the second electricity generator 133 is positioned adjacent tot the arms associated with the second wind energy generator 108. Suitable struts can be connected to the vertical member 126 so as to support the electricity generators 131 and 133 in a fixed position. Suitable other structural members can be also be incorporated so as to provide stability to the electricity generators 131 and 133. Each of the electricity generators 131 and 133 is illustrated as having magnets contained therein that are aligned with respective arms of the wind energy generators 106 and 108. As such, the electricity generators 131 and 133 can provide additional electrical power output from the wind generator assembly 110. Suitable wires or other electrical lines can extend from the first electricity generator 131 and the second electricity generator 133 to a battery or to the electrical mains.

It is important to note that by affixing the wind generator assembly 100 to the bed 130 of a truck, the wind generator assembly 100 can be transported to any desired location. The electrical generator 122 can be connected by line 124 to a battery or other energy storage arrangement. Additionally, line 124 can be connected to the electrical main for the purpose of receiving the electricity from the assembly 100. As a result of this arrangement, the present invention allows the user to properly transport the assembly 100 to any desired location. The assembly 100 can be deployed as required. The assembly 100 can be a temporary installation. If the bottom 128 of the vertical member 126 is fixedly installed within the bed 130, the truck can suitably manipulated so that the wind energy generators 106 and 108 face the full force of the wind.

Figure 4:
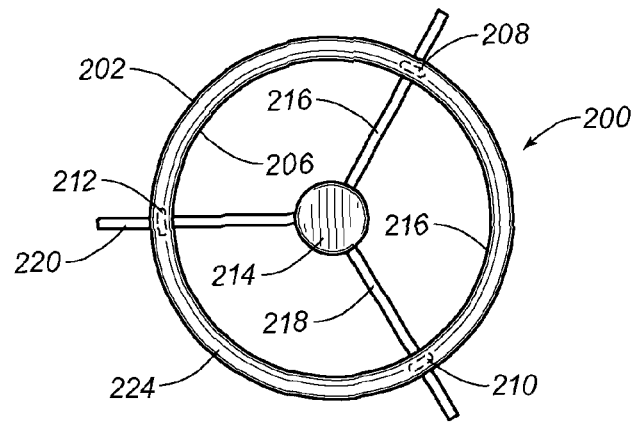
FIG. 4 is a side elevational view showing the Faraday generator of the present invention as positioned relative to the plurality of arms that extend outwardly of an axle.

FIG. 4 shows an alternative embodiment of the electricity generator 200. In this alternative embodiment of the electricity generator 200, the tubular body 202 has a rather "oblong" structure. The tubular body 202 has a first portion 204 with a radius of curvature that is less than a radius of curvature of a second portion 206. The tubular body 202 has magnets 208, 210 and 212 slidably received therein. The bearings 214 support an axle that has arms 216, 218 and 220 extending outwardly therefrom. The magnetic attraction between the arms 216, 218 and 220 with respective magnets 208, 210 and 212 will cause the magnets 208, 210 and 212 to move freely through the interior pathway 222 within the tubular body 202. There will be a coil that extends around the pathway 224 within the tubular body 202 so as to be cooperative with the magnets 208, 210 and 212 so as to produce electrical energy therefrom. A suitable exciter current can also be incorporated with the coil so as to allow the necessary electrical effect to occur.

The oblong construction of the tubular body 202 applies torque to the respective arms 216, 218 and 220 at the location where it is needed most. In other words, the wind facing arm 216 will have the magnet 208 located adjacent to the end thereof opposite the axle. As such, the magnet 208 will add weight to the end of the arm 206 at a point furthest away from the axle. This will enhance the torque-imparting characteristics of the wind energy generator. Similarly, the magnet 212 nearer to the axle associated with arm 220 will place the magnet 212 nearer to the centerline of the axle so as to minimize the torque effect during the upward movement of the arm 220.

The electricity generator 200 can serve to supplement the power produced by the wind energy generator. The electricity generator 200 does not affect the aerodynamic qualities of the wind energy generator and provides a supplemental source of power. The electricity generator 200 can be affixed at one end or at opposite ends of the arms associated with the panels of the wind energy generator. Multiple electricity generators 200 can be incorporated within the wind energy generators. Since the electricity generator 200 continues to produce electrical energy during the rotation of the panels, a significant amount of energy can be produced from the electricity generator 200. Since the wind energy generator of the present invention moves continuously, this power production will also be continuous throughout the time that the panels are rotating. The electricity from the electricity generator 200 can be passed to the utility mains or stored in a battery so as to provide supplemental or residual power, as required.

Figure 5:
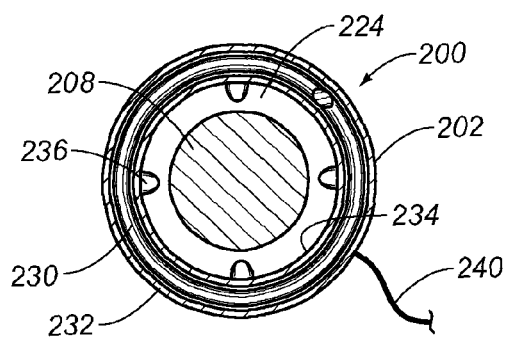
FIG. 5 is a cross-sectional view of the housing of the Faraday generator as used in the wind energy generator of the present invention.

FIG. 5 shows a cross-sectional view of the tubular body 202 of the electricity generator 200. The tubular body 202 defines an interior pathway 224. A suitable coil 230 is positioned between the outer wall 232 and the inner wall 234 of the tubular body 202 so as to be in close proximity to the magnet 208 therewithin.

The magnet 208 has a generally circular cross section and has an outer surface that is generally adjacent to the coil 230. Small projections 236 extend inwardly from the wall 234 so as to provide a guide for the magnet 208 within the pathway 224. The end of the projection opposite the wall 234 is very small so as to minimize any friction between this surface and the exterior surface of the magnet 208. Electrical line 240 is illustrated as connected to coil 230 so as to extend outwardly therefrom. As stated previously, a suitable exciter current can be applied to the coil 230 so as to allow the Faraday generator to accomplish its intended purpose.

Figure 6:
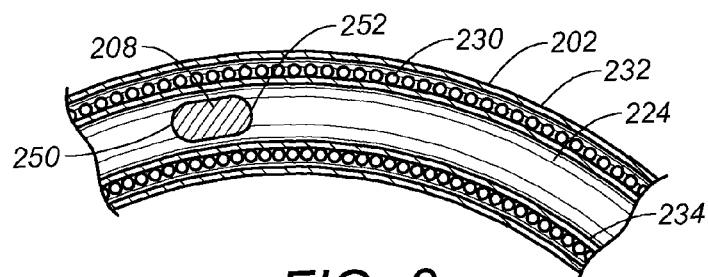
FIG. 6 is a cross-sectional view showing the position of the magnet of the Faraday generator of the present invention within the interior of the housing.

FIG. 6 is another cross-sectional view showing the tubular body 202 with the magnet 208 positioned within the interior pathway 224 therein. In FIG. 6, that tubular body 202 has an outer wall 232 and an inner wall 234. The coil 230 is positioned between the outer wall 232 and the inner wall 234. The magnet 208 is illustrated as having a first curved end 250 and a second curved end 252. The curved or dome-shaped of the ends of the magnet 208 will serve to minimize the amount of friction that can occur between the magnet 208 and the inner wall 234. The curved surface 250 and 252 will tend to funnel the magnet 208 through the interior pathway 224 of the tubular body 202.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wind power generator comprising:
   a frame;
   an axle extending horizontally and rotatably mounted relative to said frame;
   a plurality of arms extending radially outwardly of said axle;
   a plurality of panels respectively connected to said plurality of arms; and
   an electricity generating means positioned adjacent said plurality of arms, said electricity generating means for producing electrical energy as said plurality of arms rotate relative to said frame, said electricity generating means comprising a generator extending adjacent to said plurality of arms, said generator having an electrical line connected thereto, said electrical line suitable for passing electrical energy from said generator to a location away from said frame.

2. The wind power generator of claim 1, said generator comprising:
   a housing;
   a coil positioned in said housing so as to define a pathway through an interior of said coil; and
   a magnet slidably received in said pathway so as to be movable through said coil as said axle rotates.

3. The wind power generator of claim 2, said housing being affixed to the frame.

4. The wind power generator of claim 3, said housing being an annular member, said pathway being a generally circular pathway.

5. The wind power generator of claim 4, said housing having a first portion with a radius of curvature less than a radius of curvature of a second portion thereof.

6. The wind power generator of claim 3, said housing having a wall separating said magnet from said coil, said wall having at least one projection extending inwardly therefrom and into said pathway.

7. The wind power generator of claim 3, said magnet being magnetically attracted to at least one of said plurality of arms such that the arm moves the magnet through said pathway by the magnetic attraction.

8. The wind power generator of claim 3, said housing extending in a plane transverse to a plane in which of said plurality of panels extend.

9. The wind power generator of claim 3, said housing comprising a first housing positioned adjacent said plurality of arms at one end of said plurality of panels and a second housing positioned adjacent said plurality of arms at an opposite end of said plurality of panels.

10. The wind power generator of claim 1, said plurality of panels being hingedly connected to said plurality of arms at a location distal of said axle, each of said plurality of panels extending so as to have an edge opposite the hinged connection proximal said axle.

11. The wind power generator of claim 7, further comprising:
- a plurality of rollers respectively affixed adjacent said edge of said plurality of panels; and
- a line received by said plurality of rollers.

12. A wind power generator comprising:
- a frame;
- an axle extending horizontally and rotatably mounted relative to said frame;
- a plurality of arms extending radially outwardly of said axle, said plurality of arms comprising:
  - a first pair of arms extending radially and outwardly of said axle in generally parallel relation to each other;
  - a second pair of arms extending radially and outwardly of said axle in generally parallel relation to each other; and
  - a third pair of arms extending radially and outwardly of said axle in generally parallel relation to each other;
- a plurality of panels respectively connected to said plurality of arms, said plurality of panels comprising:
  - a first panel hingedly connected to said first pair of arms;
  - a second panel hingedly connected to said second pair of arms; and
  - a third panel hingedly connected to said third pair of arms; and
- an electricity generating means positioned adjacent said plurality of arms, said electricity generating means for producing electrical energy as said plurality of arms rotate relative to said frame.

* * * * *